(12) United States Patent
Zhang et al.

(10) Patent No.: US 11,200,109 B2
(45) Date of Patent: Dec. 14, 2021

(54) METHOD, DEVICE AND COMPUTER PROGRAM PRODUCT FOR PROCESSING DATA

(71) Applicant: EMC IP Holding Company LLC, Hopkinton, MA (US)

(72) Inventors: Haohan Zhang, Shanghai (CN); Dezheng Zhang, Shanghai (CN); Liangliang Liu, Shanghai (CN); Lei Shi, Shanghai (CN); Wangyuan Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/884,226

(22) Filed: May 27, 2020

(65) Prior Publication Data

US 2021/0117258 A1  Apr. 22, 2021

(30) Foreign Application Priority Data

Oct. 21, 2019  (CN) .......................... 201911002251.2

(51) Int. Cl.
*G06F 11/07* (2006.01)
*G06F 11/14* (2006.01)

(52) U.S. Cl.
CPC ........ *G06F 11/079* (2013.01); *G06F 11/0772* (2013.01); *G06F 11/0778* (2013.01); *G06F 11/1489* (2013.01)

(58) Field of Classification Search
CPC ............... G06F 3/0638; G06F 11/0706; G06F 11/0778; G06F 11/079; G06F 11/0772

USPC ....................................................... 714/38.11
See application file for complete search history.

(56) References Cited

U.S. PATENT DOCUMENTS

| 6,813,522 B1 | 11/2004 | Schwarm et al. |
| 7,020,669 B2 | 3/2006 | McCann et al. |
| 7,636,804 B2 * | 12/2009 | Bolt ........................ G06F 3/061 710/68 |
| 7,849,350 B2 | 12/2010 | French et al. |
| 8,713,356 B1 | 4/2014 | Chan et al. |
| 8,935,560 B2 | 1/2015 | Lu et al. |
| 8,949,221 B1 | 2/2015 | Van Rotterdam et al. |
| 9,158,540 B1 | 10/2015 | Tzelnic et al. |
| 9,223,679 B1 | 12/2015 | Ho et al. |
| 9,286,261 B1 | 3/2016 | Tzelnic et al. |

(Continued)

*Primary Examiner* — Joseph R Kudirka
(74) *Attorney, Agent, or Firm* — BainwoodHuang

(57) ABSTRACT

Techniques involve in response to receiving, from a failure analysis device, a request for obtaining a to-be-analyzed data block in a set of raw data blocks in a data file related to a failure of an operating system, determining a position of the to-be-analyzed data block in a compressed file for the data file, the request comprising a position of the to-be-analyzed data block in the data file. The techniques further involve determining, based on the position of the to-be-analyzed data block in the compressed file, a compressed data block in the compressed file corresponding to the to-be-analyzed data block. The techniques further involve sending the compressed data block to the failure analysis device for analyzing the failure. Accordingly, the time for analyzing the failure may be saved, the amount of data transmission and the resources occupied by decompression may be reduced, and the processing efficiency may be improved.

23 Claims, 6 Drawing Sheets

(56) References Cited

U.S. PATENT DOCUMENTS

| | | | |
|---|---|---|---|
| 9,313,091 | B1 | 4/2016 | Schnegelberger et al. |
| 9,652,568 | B1 | 5/2017 | Tzelnic et al. |
| 9,983,924 | B2 | 5/2018 | Schnegelberger et al. |
| 10,091,297 | B1 | 10/2018 | Zhao et al. |
| 10,114,731 | B2 | 10/2018 | Fan et al. |
| 10,229,017 | B1 | 3/2019 | Zou et al. |
| 10,235,234 | B2 | 3/2019 | Xiao et al. |
| 10,372,560 | B2 | 8/2019 | Danilov et al. |
| 10,469,585 | B2 | 11/2019 | Zhao et al. |
| 10,860,481 | B2 | 12/2020 | Xu et al. |
| 10,860,483 | B2 | 12/2020 | Fliess et al. |
| 2014/0215170 | A1* | 7/2014 | Scarpino ............... G06F 3/0608 711/161 |
| 2018/0364949 | A1* | 12/2018 | Aston ..................... G06F 3/061 |

* cited by examiner

METHOD, DEVICE AND COMPUTER PROGRAM PRODUCT FOR PROCESSING DATA

CROSS-REFERENCE TO RELATED APPLICATION

This application claims priority to Chinese Patent Application No. CN201911002251.2, on file at the China National Intellectual Property Administration (CNIPA), having a filing date of Oct. 21, 2019, and having "METHOD, DEVICE AND COMPUTER PROGRAM PRODUCT FOR PROCESSING DATA" as a title, the contents and teachings of which are herein incorporated by reference in their entirety.

FIELD

Embodiments of the present disclosure relate to the field of computers, and specifically to a method, device and computer program product for processing data.

BACKGROUND

For computing devices, a running operating system does not always operate stably. In some important fields, if the running operating system fails, the content of a memory needs to be saved to form a data file, such as a dump file. This data file is then used to analyze the cause of the failure so that the failure in the system can be reduced to better run the operating system. For example, in some storage systems, when the system crashes, the memory data in the storage system needs to be saved to analyze the failure of the operating system.

However, in order to improve the performance of a computing device, the computing device is configured with more powerful CPU cores and more memory. At this time, more and more memory data needs to be managed. Therefore, if the operating system fails, it will result in a larger data file for the storage system. For ease of processing, these data files are usually compressed into a compressed file. However, there are still many issues that need to be addressed when analyzing the failure of the operating system.

SUMMARY

Embodiments of the present disclosure provide a method, device and computer program product for processing data.

According to a first aspect of the present disclosure, there is provided a method of processing data. The method includes in response to receiving, from a failure analysis device, a request for obtaining a to-be-analyzed data block in a set of raw data blocks in a data file related to a failure of an operating system, determining a position of the to-be-analyzed data block in a compressed file for the data file, the request including a position of the to-be-analyzed data block in the data file. The method further includes determining, based on the position of the to-be-analyzed data block in the compressed file, a compressed data block in the compressed file corresponding to the to-be-analyzed data block. The method further includes sending the compressed data block to the failure analysis device for analyzing the failure.

According to a second aspect of the present disclosure, there is provided a method for analyzing a failure. The method includes: determining, based on original position information of a set of raw data blocks in a data file related to a failure of an operating system, a position of a to-be-analyzed data block in the set of raw data blocks in the data file. The method further includes sending, to a data processing device, a request for obtaining the to-be-analyzed data block, the request including a position of the to-be-analyzed data block in the data file. The method further includes receiving, from the data processing device, a compressed data block corresponding to the to-be-analyzed data block for analyzing the failure.

According to a third aspect of the present disclosure, there is provided an electronic device. The device includes a processor; and a memory storing computer program instructions, and the processor running the computer program instructions in the memory to control the device to perform acts including: in response to receiving, from a failure analysis device, a request for obtaining a to-be-analyzed data block in a set of raw data blocks in a data file related to a failure of an operating system, determining a position of the to-be-analyzed data block in a compressed file for the data file, the request including a position of the to-be-analyzed data block in the data file; determining, based on the position of the to-be-analyzed data block in the compressed file, a compressed data block in the compressed file corresponding to the to-be-analyzed data block; and sending the compressed data block to the failure analysis device for analyzing the failure.

According to a fourth aspect of the present disclosure, there is provided an electronic device. The device includes a processor; and a memory storing computer program instructions, and the processor running the computer program instructions in the memory to control the device to perform acts including: determining, based on original position information of a set of raw data blocks in a data file related to a failure of an operating system, a position of a to-be-analyzed data block in the set of raw data blocks in the data file; sending, to a data processing device, a request for obtaining the to-be-analyzed data block, the request including a position of the to-be-analyzed data block in the data file; and receiving, from the data processing device, a compressed data block corresponding to the to-be-analyzed data block for analyzing the failure.

According to a fifth aspect of the present disclosure, there is provided a computer program product being tangibly stored on a non-volatile computer-readable medium and including machine-executable instructions that, when executed, cause the machine to perform steps of the method according to the first aspect of the present disclosure.

According to a sixth aspect of the present disclosure, there is provided a computer program product being tangibly stored on a non-volatile computer-readable medium and including machine-executable instructions that, when executed, cause the machine to perform steps of the method according to the second aspect of the present disclosure.

BRIEF DESCRIPTION OF THE DRAWINGS

The above and other features, advantages and aspects of embodiments of the present disclosure will be made more apparent by describing example embodiments of the present disclosure in more detail with reference to figures. In the example embodiments of the present disclosure, the same reference signs usually represent the same element, wherein.

In all figures, the same or corresponding reference signs represent the same or corresponding parts.

DETAILED DESCRIPTION OF EMBODIMENTS

Figure 1:
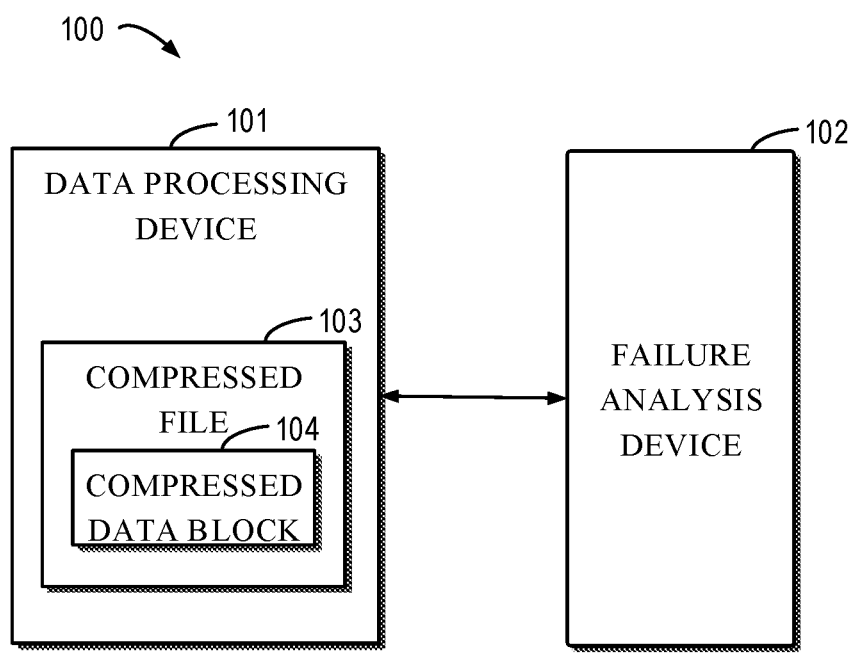
FIG. 1 illustrates a schematic diagram of an example environment 100 in which devices and/or methods according to embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described below in more detail with reference to figures. Although figures show preferred embodiments of the present disclosure, it should be appreciated that the present disclosure may be implemented in various forms and should not be limited by embodiments stated herein. On the contrary, these embodiments are provided to make the present disclosure more apparent and complete. It should be appreciated that figures and embodiments of the present disclosure are only used for example purposes and not to the limit protection scope of the present disclosure.

As described in embodiments of the present disclosure, the terms "includes", "comprises" or like terms should be understood as open-ended terms that mean "includes, but is not limited to." The term "based on" is to be read as "based at least in part on." The term "an embodiment" or "the embodiment" should be understood as "at least one embodiment". The terms "first", "second", etc. may refer to different or the same objects. Other explicit and implicit definitions might be included below.

The principles of the present disclosure are described below with reference to several example embodiments illustrated in the drawings. Although preferred embodiments of the present invention have been shown in the drawings, it should be understood that these embodiments are only intended to enable those skilled in the art to better understand and thereby implement the present disclosure, not to limit the scope of the present disclosure in any manner.

Usually, when an operating system crashes, the memory data will be saved as a data file. The data file is then compressed to form a compressed file. In order to analyze the operating system failure, the data processing device sends the entire compressed file to a failure analysis device for analyzing the failure. After receiving the compressed file, the failure analysis device first decompresses the compressed file to obtain a decompressed file, and then debugs the decompressed file to analyze the failure.

The increase of device processor cores and memory causes a larger compressed file. It takes a lot of time to upload the compressed file from a data processing device to the failure analysis device. Similarly, the failure analysis device needs a larger disk space to decompress the uploaded compressed file, and then uses a debugger (such as gdb) for final post-analysis, which reduces the efficiency of the disk space usage. In addition, because the analysis is performed after the decompression is completed, a long wait time is also caused.

In order to solve the above problems, the present disclosure proposes a solution for processing data. In this solution, the data processing device receives, from a failure analysis device, a request for obtaining a to-be-analyzed data block related to an operating system failure. The data processing device determines, based on the position of the to-be-analyzed data block in the compressed file, a compressed data block in the compressed file corresponding to the to-be-analyzed data block. The compressed data block is sent to the failure analysis device to determine the operating system failure. According to the method, the time for analyzing the analysis can be saved by causing the failure analysis device to start analysis based on the received partial compressed data, without receiving all the compressed files. Since many failures might be determined without using all the data, the amount of data transmission and the resources occupied by decompression are reduced, and the processing efficiency is improved.

FIG. 1 illustrates a schematic diagram of an example environment 100 in which devices and/or methods according to embodiments of the present disclosure may be implemented.

The environment 100 includes a data processing device 100 and a failure analysis device 102. An operating system runs on the data processing device 101. When the operating system of the data processing device 101 fails, for example, when the system crashes, the data processing device 101 saves the data in the memory in the data processing device 101. The data in the memory is stored in a data file such as a memory dump file or a core dump file related to the operating system failure.

In some embodiments, the operating system failure includes failures occurring in applications developed on the operating system. At this time, the data related to the operating system failure includes data related to the application.

In some embodiments, since the generated data file is relatively large, the data processing device 101 compresses the data file to generate a compressed file 103. The data processing device 101 stores the compressed file 103 in a storage device associated with the data processing device 101, for example, a disk array for storing data. The data processing device 101 may send the compressed file 103 to the failure analysis device 102 for analyzing the failure.

The data processing device 101 may be implemented as any type of data processing device, including but not limited to mobile phones (e.g., smartphones), laptop computers, Portable Digital Assistants (PDAs), E-book readers, portable game machine, portable media players, game machines, set-top boxes (STB), smart televisions (TV), personal computers, laptop computers, on-board computers (e.g., navigation units), and the like.

Upon storing data in the memory to a data file related to the operating system failure, the data processing device 101 forms a set of raw data blocks based on the data in the memory. The set of raw data blocks includes two parts. The first part is a first data block subset related to the application of the operating system, such as the compiled code of the application of the operating system, the parameters of the application, and the like. The second part is a second data block subset related to the input and output operations of the application. The data processing device 101 will further determine original position information of the position of the set of raw data blocks in the data file, such as an offset and a length of the data block in the data file. The data processing device 101 further determines other information related to the set of raw data blocks, such as the position of the data block in the memory, such as the offset and length of the data block in the memory, and the like.

In some embodiments, upon generating the data file, the data processing device 101 sequentially stores the original position information of the set of raw data blocks, the first subset of data blocks and the second subset of data blocks into the data file.

In some embodiments, when failure analysis is performed on the compressed file 103, the data processing device 101 obtains the compressed file 103. The data processing device 101 performs decompression and scanning for the compressed file 103. The data processing device 101 then generates file metadata for the compressed file 103. The file metadata includes at least the original position information of the set of raw data blocks in the data file and compressed position information related to the set of raw data blocks. The compressed position information indicates a position of a set of compressed data blocks in the compressed file 103 which corresponds to the set of raw data blocks.

When the compressed file 103 needs to be transmitted to the failure analysis device 102 for analyzing the failure, the data processing device 101 transmits at least a portion of the compressed file 103 to the failure analysis device 102.

The data processing device 101 may include a hardware processor, including but not limited to a hardware Central Processing Unit (CPU), a Field Programmable Gate Array (FPGA), a Complex Programmable Logic Device (CPLD), and an Application Specific Integrated Circuit (ASIC), System-on-chip (SoC), or a combination thereof.

The failure analysis device 102 may perform failure analysis for a portion of the received compressed file 103. The portion at least includes the original position information and the first subset of data blocks. The failure analysis device 102 performs decompression processing for this portion, and then analyzes the decompressed file to determine the operating system failure. In some embodiments, the failure analysis device 102 has a debugger therein, which analyzes the received decompressed file 103.

The failure analysis device 102 includes, but is not limited to, personal computers, server computers, handheld or laptop devices, mobile devices (such as mobile phones, Personal Digital Assistants (PDAs), media players, etc.), multiprocessor systems, consumable electronic products, small computers, mainframe computers, distributed computing environments including any of the above systems or devices, and the like.

In some embodiments, the failure analysis device 102 no longer receives the remaining data in the compressed file 103 after receiving a portion of the compressed file 103. The failure analysis device 102 performs decompression processing for the received portion. The failure analysis device 102 then determines whether a failure of the operating system is in this portion. When the failure analysis device 102 cannot determine the operating system failure according to the received portion, the position of the to-be-analyzed data block in the data file may be determined based on the original position information in the decompressed portion. Then, the failure analysis device 102 sends the position to the data processing device 101 to obtain a compressed data block 104 corresponding to the position. The data processing device 101 finds the position from the original position information, and then finds the corresponding compressed position in the compressed position information to determine the corresponding compressed data block 104.

In some embodiments, the failure analysis device 102 continues to receive the remaining data in the compressed file 103 after receiving a portion of the compressed file 103. After receiving the portion, the failure analysis device 102 decompresses the portion to analyze the failure of the operating system, for example, the failure of an application developed on the operating system. When the failure analysis device 102 cannot determine the operating system failure according to the received portion, the failure analysis device 102 may determine the position of the to-be-analyzed data block in the data file based on the original position information in the portion. The failure analysis device 102 then determines, based on the position, such as the offset and length of the data block in the data file, whether there is a compressed data block in the compressed data block already received by the failure analysis device 102 which corresponds to the data block. If there is no the compressed data block, the failure analysis device 102 sends the position to the data processing device 101 to obtain a compressed data block 104 corresponding to the position. If there is the compressed data block, the corresponding compressed data block is decompressed for analyzing the failure.

Figure 2:
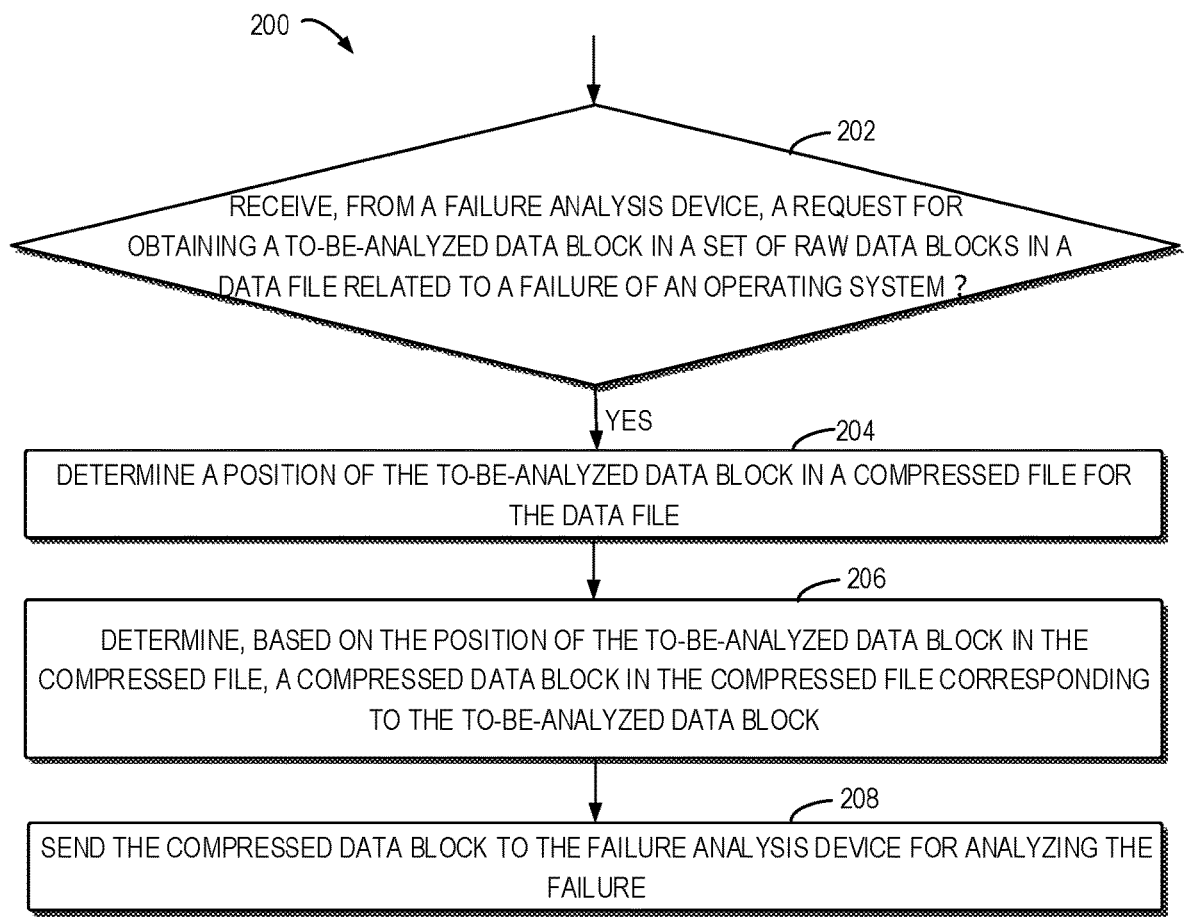
FIG. 2 illustrates a flowchart of a method 200 for processing data according to an embodiment of the present disclosure.

In the above, FIG. 1 illustrates an example environment 100 for processing data, and a method 100 for processing data is described in detail below with reference to FIG. 2. It should be understood that the method in FIG. 2 may be executed by the data processing device 101, and may also be executed by other appropriate devices.

At block 202, the data processing device 101 determines whether a request for obtaining a to-be-analyzed data block in a set of raw data blocks in a data file related to a failure of the operating system is received from the failure analysis device 102. The request includes the position of the to-be-analyzed data block in the data file. The failure analysis device 102 analyzes the failure of the operating system according to a partial data file of the received data file. If there is no failure in the analyzed data file, the failure analysis device 102 determines the to-be-analyzed data block. If the to-be-analyzed data block does not exist in the failure analysis device 102, the failure analysis device 102 will send the data processing device 101 a request to obtain the to-be-analyzed data block.

In some embodiments, the failure analysis device 102 may determine the position of the to-be-analyzed data block in the data file, for example, the offset and length of the to-be-analyzed data block in the data file. Alternatively or additionally, the failure analysis device 102 includes a debugger. The debugger analyzes the obtained partial data file. When the partial data file is analyzed and no failure is determined, the debugger determines the position of the to-be-analyzed data block in the data file.

In some embodiments, when the operating system of the data processing device 101 fails, for example, when the system crashes or an application developed on the operating system fails, the data processing device 101 generates a data file such as a core dump file or a memory dump file related to the failure of the operating system.

In the process of generating the data file, the data processing device 101 will determine a set of raw data blocks from the data related to the failure, and the set of raw data blocks includes a first subset of data blocks related to the application in the operating system (e.g., a linux operating system) and a second subset of data blocks related to an input/output operation of the application.

For example, the data in the first subset of data blocks includes a compiled text of the application and parameters for the application, etc.; the data in the second subset of data blocks includes input/output data stored in a storage space dynamically allocated for the application.

The data processing device 101 further determines the original position information according to the positions of the first subset of data blocks and the second subset of data blocks in the data file. The original position information indicates the position of the set of raw data blocks in the data file, for example, the length and offset of the set of raw data blocks in a data file. Alternatively or additionally, the data processing device 101 may further generate other information related to the first subset of data blocks and the second subset of data blocks, such as the position and offset of the data blocks in the memory, and so on.

The data processing device 101 then stores the original position information, the first subset of data blocks and the second subset of data blocks in the data file. Alternatively or additionally, the original position information, the first subset of data blocks and the second subset of data blocks are sequentially stored in the data file. In some embodiments, the data file includes header information and file content information. The header information may include information related to the data file, such as an identification of the data file and original position information of the data block. The file content information includes the first subset of data blocks and the second subset of data blocks. Alternatively or additionally, the header information, the first subset of data blocks and the second subset of data blocks are stored sequentially.

In some embodiments, the data processing device 101 compresses the data file into the compressed file 103. Alternatively or additionally, the data processing device 101 stores the compressed file 103 on a storage device associated therewith, such as a disk array.

In some embodiments, the data processing device 101 needs to send the compressed file 103 of the data file related to the operating system to the failure analysis device 102 for analyzing the failure. The data processing device 101 obtains the compressed file 103 of the data file, and then transmits the compressed file 103 to the failure analysis device 102. The transmitted data includes the compressed data in the compressed file 103 which corresponds to the original position information. The failure analysis device 102 determines that the to-be-analyzed data block needs to be obtained from the data processing device 101 based on the original position information.

When it is determined that the data processing device 101 receives a request for obtaining a to-be-analyzed data block, at block 204, the data processing device 101 determines a position of the to-be-analyzed data block in the compressed file 103 for the data file. According to the position of the to-be-analyzed data block in the data file, the data processing device 101 may determine a first offset and a first length of the to-be-analyzed data block in the data file. In some embodiments, the position of the to-be-analyzed data block in the data file includes a first offset and a first length of the to-be-analyzed data block in the data file.

Based on the first offset and the first length, the data processing device 101 may determine a second offset and a second length of the to-be-analyzed data block in the compressed file 103. In some embodiments, the data processing device 101 performs decompression scanning for the compressed file 103 to generate file metadata for the compressed file 103, where the file metadata includes the original position information of the set of raw data blocks in the data file and compressed position information of the compressed data blocks in the compressed file 103 which correspond to the set of raw data blocks. Therefore, the file metadata includes a correspondence relationship between the first offset and the first length and the second offset and the second length of the to-be-analyzed data block.

At block 206, the data processing device 101 determines, based on the position of the to-be-analyzed data block in the compressed file 103, a compressed data block 104 in the compressed file 103 corresponding to the to-be-analyzed data block.

In some embodiments, the data processing device 101 determines, based on the position of the to-be-analyzed data block in the compressed file 103, the second offset and the second length of the to-be-analyzed data block in the compressed file 103. Then, the data processing device 101 finds the compressed data block 104 from the compressed file 103 according to the second offset and the second length.

At block 208, the data processing device 101 sends the compressed data block 104 to the failure analysis device 102 for analyzing the failure. After obtaining the compressed data block 104 corresponding to the to-be-analyzed data block, the data processing device 101 sends the found compressed data block 104 to the failure analysis device.

Through the above method, the failure analysis device 102 can start analysis based on the received partial compressed data, without receiving all the compressed files, thereby saving the time for failure analysis. Since many failures can be determined without using all the data, the amount of data transmission and the resources occupied by decompression are reduced, and the processing efficiency is improved.

Figure 3:
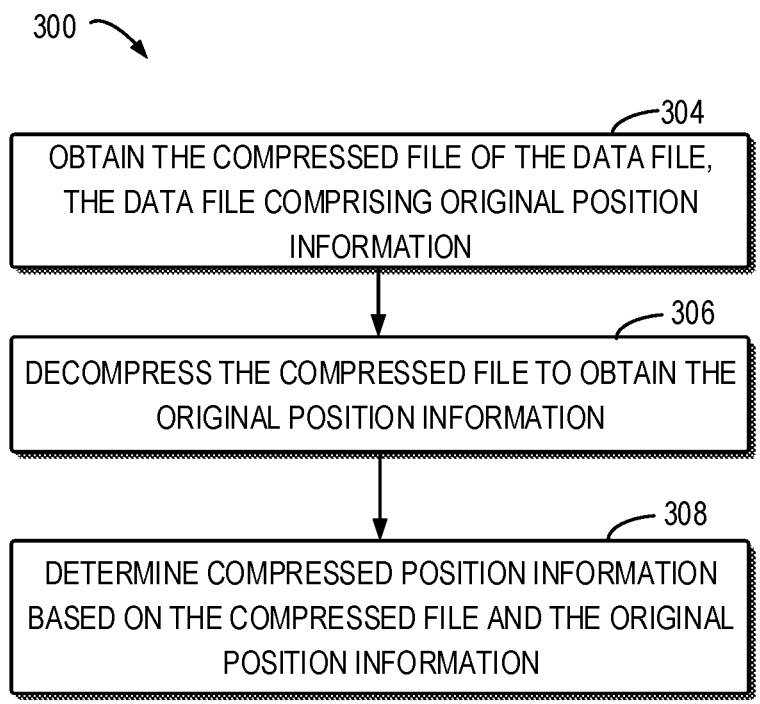
FIG. 3 illustrates a flowchart of a method 300 for determining position information of a data block according to an embodiment of the present disclosure.

The process of processing data at the data processing device 101 is described above with reference to FIG. 1 and FIG. 2, and the process of determining the position information of the data block is described in detail below with reference to FIG. 1 and FIG. 3, where FIG. 3 illustrates a flowchart of a method 300 for determining position information of a data block according to an embodiment of the present disclosure. The method of FIG. 3 may be executed for example by the data processing device 101.

At block 302, the data processing device 101 obtains the compressed file 103 of the data file, the data file includes original position information. The original position information indicates the position of the set of raw data blocks in the data file.

In some embodiments, the data processing device 101 reads the compressed file 103 from a storage device associated with the data processing device 101.

At block 304, the data processing device 101 decompresses the compressed file 103 to obtain original position information. When obtaining the original position information, a debugging assistant in the data processing device 101 performs decompression scanning for the compressed file 103 to obtain the original position information in the data file. Alternatively or additionally, the data processing device 101 may further obtain any information in the compressed file 103.

At block 306, the data processing device 101 determines the compressed position information based on the compressed file 103 and the original position information. The compressed position information indicates the position of a set of compressed data blocks in the compressed file 103 corresponding to the set of raw data blocks. After obtaining the original position information of the set of raw data blocks, the compressed position information of a set of compressed data blocks in the compressed file 103 which corresponds to the set of raw data blocks can be determined.

Through the above method, the correspondence relationship between the positions of the raw data blocks in the data file and the compressed data blocks in the compressed file can be generated at the data processing device. Therefore, the compressed positions in the compressed file related to the raw data blocks may be quickly determined based on the positions of the raw data blocks in the data file, which improves the efficiency of obtaining the compressed data block, and saves the time for obtaining data.

Figure 4:
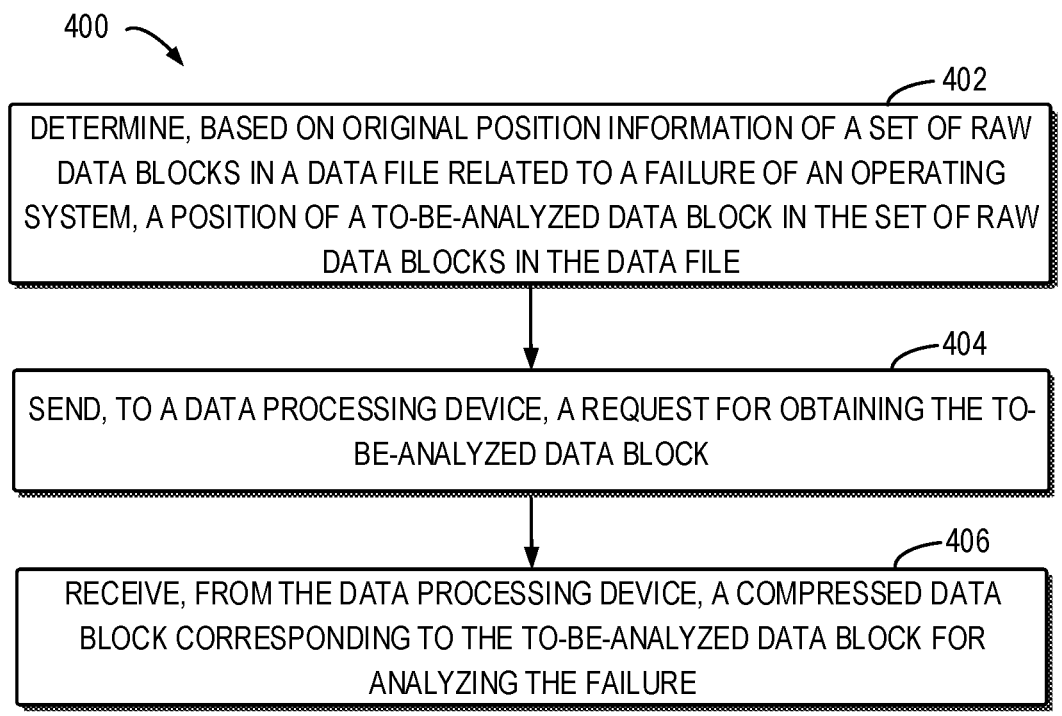
FIG. 4 illustrates a flowchart of a method 400 for analyzing the failure according to an embodiment of the present disclosure.

The process of determining the position information of the data block at the data processing device 101 is described above with reference to FIG. 1 and FIG. 3, and a process of processing data at the failure analysis device 102 is described in detail below with reference to FIG. 1 and FIG. 4. FIG. 4 illustrates a flowchart of a method 400 for processing data according to an embodiment of the present disclosure. The method of FIG. 4 may be performed, for example, by the failure analysis device 102.

At block 402, the failure analysis device 102 determines, based on the original position information of the set of raw data blocks in the data file related to the failure of the operating system, the position of the to-be-analyzed data block in the set of raw data blocks in the data file.

In some embodiments, the failure analysis device 102 receives at least one portion of the compressed file 103 for the data file, the at least one portion including the compressed data corresponding to the original position information and compressed data blocks corresponding to the received data blocks in the set of raw data blocks. Then, the failure analysis device 102 uses the at least one portion to determine the original position and the compressed position corresponding to the received data blocks.

In some embodiments, the at least one portion is the compressed data corresponding to the original position information and the compressed data blocks corresponding to the received data blocks in the set of raw data blocks, received by the failure analysis device 102. The failure analysis device 102 only decompresses the portion to analyze the failure. During the analysis, the failure analysis device 102 no longer receives the data of the compressed file 103 from the data processing device 101.

In some embodiments, the at least one portion not only includes the compressed data corresponding to the original position information and the compressed data blocks corresponding to the received data blocks in the set of raw data blocks, received by the failure analysis device 102, but also includes the data of the compressed file 103 received by the failure analysis device 102 constantly while the failure analysis device 102 decompresses the portion to analyze the failure.

In some embodiments, the failure analysis device 102 performs decompression scanning for the at least one portion of the compressed file 103, and then determines the original position information included in the portion and the received data blocks, for example, the first subset of data blocks. Then, the failure analysis device 102 determines the original position of the received data block based on the original position information and the received data blocks. The failure analysis device 102 determines the compressed positions of the compressed data blocks corresponding to the received data blocks based on the original positions of the received data blocks and the at least one portion of the compressed file 103.

At block 404, the failure analysis device 102 sends the data processing device 101 a request for obtaining the to-be-analyzed data block, the request including the position of the to-be-analyzed data block in the data file.

In some embodiments, after determining the position of the to-be-analyzed data block in the data file, the failure analysis device 102 directly sends the request to the data processing device 101.

In some embodiments, the failure analysis device 102 determines whether the to-be-analyzed data block is in the received data blocks in the set of raw data blocks based on the position of the to-be-analyzed data block in the data file. If the failure analysis device 102 determines that the to-be-analyzed data block is not in the received data blocks, the failure analysis device 102 sends, to the data processing device 101, a request for obtaining the to-be-analyzed data block. If the failure analysis device 102 determines that the to-be-analyzed data block is in the received data blocks, the failure analysis device 102 decompresses the compressed data block 104 corresponding to the to-be-analyzed data block to continue to analyze the failure.

In some embodiments, when determining whether the to-be-analyzed data block is in the received data blocks, the position of the to-be-analyzed data block in the data file is compared with the original positions of the determined received data blocks in the failure analysis device 102. If the position of the to-be-analyzed data block is in the original positions of the received data blocks, this indicates that the to-be-analyzed data block has been received. Then, a compressed position corresponding to the position of the to-be-analyzed data block may be determined at this time. Thereby, the compressed data block 104 in at least one portion of the received compressed file 103 that corresponds to the compressed position is decompressed for analyzing the failure. If the position of the to-be-analyzed data block is not in the original positions of the received data blocks, this indicates that the to-be-analyzed data block has not yet been received.

At block 406, the failure analysis device 102 receives, from the data processing device 101, the compressed data block 104 corresponding to the to-be-analyzed data block for analyzing the failure. After receiving the request from the failure analysis device 102, the data processing device 101 sends the compressed data block 104 to the failure analysis device 102 based on the request. After receiving the compressed data block 104, the failure analysis device 102 decompresses it for analyzing the failure.

Through the method described above, the failure analysis device may quickly perform failure analysis, and save the time for analysis. Furthermore, the data is requested from the data processing device, thereby the data transmitted from the data processing device to the failure analysis device is reduced, and the efficiency is improved.

Figure 5:
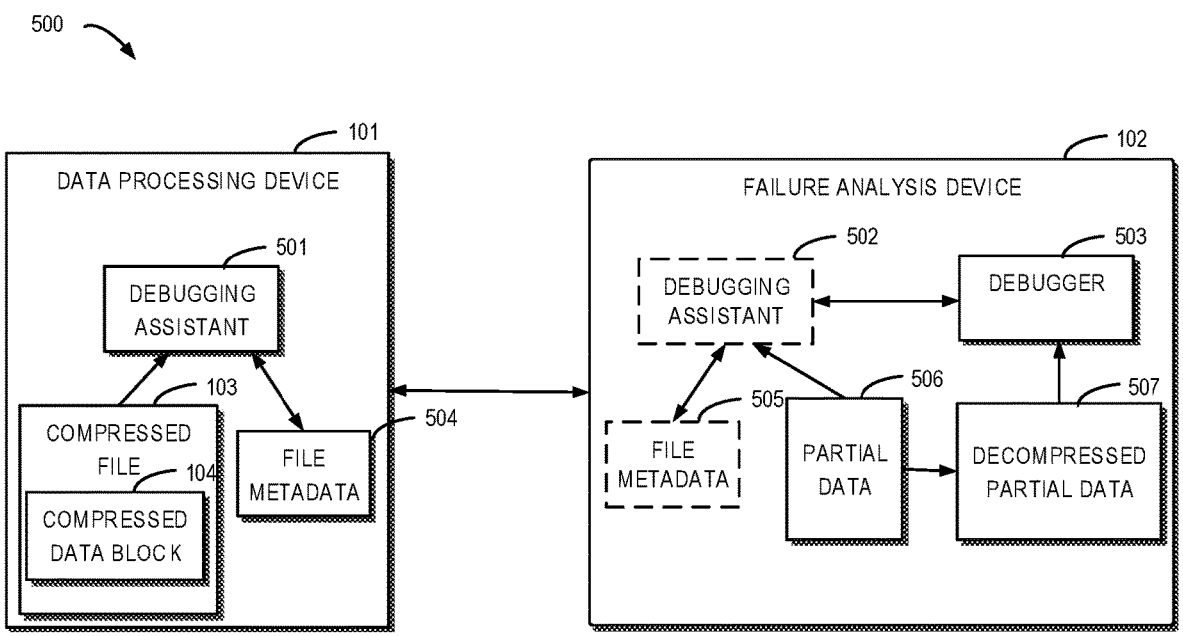
FIG. 5 illustrates a schematic diagram of an example environment 500 in which devices and/or methods according to embodiments of the present disclosure may be implemented.

The process for processing data on the side of the failure analysis device 102 is described above with reference to FIG. 1 and FIG. 4, and a specific example environment for processing data is described in detail below with reference to FIG. 5. FIG. 5 illustrates a schematic diagram of an example environment 500 in which devices and/or methods according to embodiments of the present disclosure may be implemented. The example environment 500 shown in FIG. 5 is a specific example of the example environment 100 in FIG. 1.

The data processing device 101, failure analysis device 102, compressed file 103 and compressed data block 104 included in the environment 500 have been described in detail in FIG. 1 and will not be described in detail any longer here.

The data processing device 101 includes a debugging assistant 501. The debugging assistant 501 is configured to perform decompression scanning for the compressed file 103 and then generate file metadata 504 for the compressed file 103. In some embodiments, the file metadata 504 includes original position information and compressed position information corresponding to the set of raw data blocks. The original position information indicates the positions of the set of raw data blocks in the data file, and the compressed position information indicates the position of a set of compressed data blocks in the compressed file 103 corresponding to the set of raw data blocks. For example, the original position information includes the offset and length of the raw data blocks in the data file, and the compressed position information includes the offset and length of the compressed data block in the compressed file 103. Alternatively or additionally, the file metadata 504 may further include an identification of the file metadata 504, a virtual address range, and so on.

The debugging assistant 501 may further determine, based on the position of the to-be-analyzed data block in the data file received from the failure analysis device 102 and the file metadata 504, the compressed data block 104 corresponding to the to-be-analyzed data block.

The failure analysis device 102 at least receives partial data 506 of the compressed file 103. The partial data 506 at least includes the original position information and the first subset of data blocks. The failure analysis device 103 decompresses the partial data 506 to generate decompressed partial data 507. Then, failure analysis is performed on the decompressed partial data 507 by the debugger 503.

The debugger 503 analyzes the decompressed partial data 507. If no failure is determined, the debugger 503 may determine the to-be-analyzed data block based on the decompressed partial data 507, for example, determine the position of the to-be-analyzed data block in the data file.

In some embodiments, the failure analysis device 102 no longer receives data after receiving the partial data 506. After determining the position of the to-be-analyzed data block in the data file, the position is sent to the data processing device 101 to obtain the compressed data block 104 corresponding to the data block.

In some embodiments, optionally, the failure analysis device 102 further includes a debugging assistant 502. When the debugger 503 analyzes the decompressed partial data 507, the failure analysis device 102 continues to receive the compressed data of the compressed file 103 from the data processing device 101. Optionally, the debugging assistant 502 performs decompression scanning for the partial data 506 and subsequently-received data to generate file metadata 505. The file metadata 505 includes partial original position information and partial compressed position information of the received data blocks.

After determining the position of the to-be-analyzed data block in the data file, the debugging assistant 502 determines whether the to-be-analyzed data block has been received based on the position and the file metadata 505. If the to-be-analyzed data block has been received, the corresponding compressed data block 104 is decompressed for use by the debugger 503. If the to-be-analyzed data block has not yet been received, a request is sent to the data processing device 101 to obtain the to-be-analyzed data block.

Figure 6:
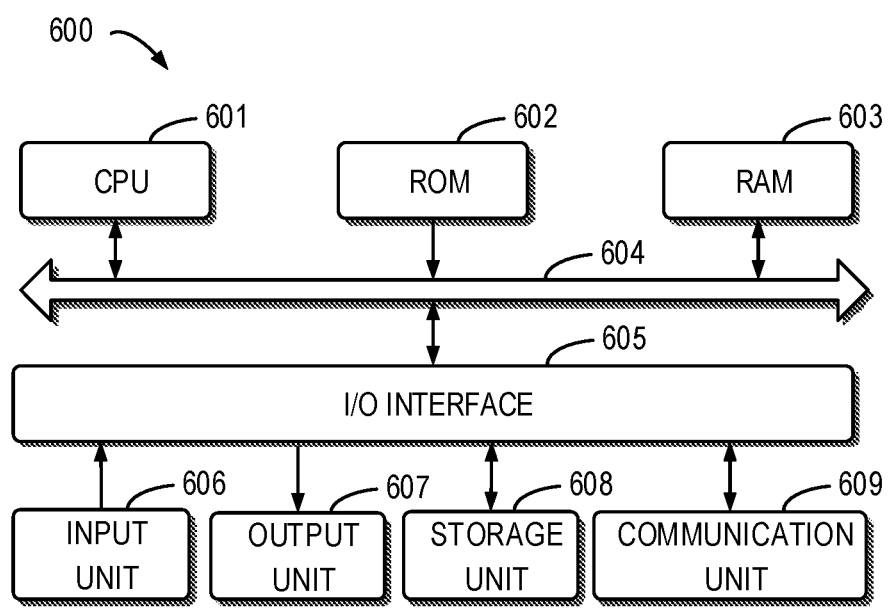
FIG. 6 illustrates a schematic block diagram of an example device 600 adapted to implement embodiments of the present disclosure.

FIG. 6 illustrates a schematic block diagram of an example device 500 that may be used to implement an embodiment of the content of the present disclosure. For example, the data processing device 101 and failure analysis device 102 shown in FIG. 1 and FIG. 5 may be implemented by the device 600. As shown, the device 600 includes a central processing unit (CPU) 601 which is capable of performing various proper actions and processes in accordance with a computer program instruction stored in a read only memory (ROM) 602 or a computer program instruction loaded from a storage unit 608 to a random access memory (RAM) 603. Various programs and data needed in the operation of the device 600 may also be stored in the RAM 603. The CPU 601, the ROM 602 and the RAM 603 are connected to one another via a bus 604. An input/output (I/O) interface 605 is also connected to the bus 604.

The following components in the device 600 are connected to the I/O interface 605: an input unit 606 including a keyboard, a mouse, or the like; an output unit 607, e.g., various displays and loudspeakers; a storage unit 608 such as a magnetic disk, an optical disk or the like; and a communication unit 609 such as a network card, a modem, a radio communication transceiver. The communication unit 609 allows the device 600 to exchange information/data with other devices via a computer network such as Internet and/or various telecommunication networks.

The above-described procedures and processes such as methods 200, 300 and 400 may be implemented by the processing unit 601. For example, in some embodiments, the methods 200, 300 and 400 may be implemented as a computer software program, which is tangibly included in a machine-readable medium such as the storage unit 608. In some embodiments, part or all of the computer program may be loaded and/or installed on the device 600 via the ROM 602 and/or the communication unit 609. When the computer program is uploaded to the RAM603 and executed by the CPU601, one or more acts of the above methods 200, 300 and 400 may be implemented.

The present disclosure may be a method, a device, a system and/or a computer program product. The computer program product may include a computer-readable storage medium (or media) having computer-readable program instructions thereon for carrying out aspects of the present disclosure.

The computer-readable storage medium may be a tangible device that may retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, may be implemented by computer-readable program instructions.

These computer-readable program instructions may be provided to a processing unit of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer-readable program instructions may also be stored in a computer-readable storage medium that may direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A method of processing data, comprising:
in response to receiving, from a failure analysis device, a request for obtaining a to-be-analyzed data block in a set of raw data blocks in a data file related to a failure of an operating system, determining a position of the to-be-analyzed data block in a compressed file for the data file, the request comprising a position of the to-be-analyzed data block in the data file;
determining, based on the position of the to-be-analyzed data block in the compressed file, a compressed data block in the compressed file corresponding to the to-be-analyzed data block; and
sending the compressed data block to the failure analysis device for analyzing the failure.

2. The method according to claim 1, wherein determining the position of the to-be-analyzed data block in the compressed file for the data file comprises:
determining, based on the position of the to-be-analyzed data block in the data file, a first offset and a first length of the to-be-analyzed data block in the data file; and
determining, based on the first offset and the first length, a second offset and a second length of the to-be-analyzed data block in the compressed file.

3. The method according to claim 1, wherein determining the compressed data block corresponding to the to-be-analyzed data block comprises:
determining, based on the position of the to-be-analyzed data block in the compressed file, a second offset and a second length of the to-be-analyzed data block in the compressed file; and
determining, based on the second offset and the second length, the compressed data block in the compressed file.

4. The method according to claim 1, further comprising:
obtaining the compressed file of the data file, the data file comprising original position information, the original position information indicating positions of the set of raw data blocks in the data file;
decompressing the compressed file to obtain the original position information; and
determining compressed position information based on the compressed file and the original position information, the compressed position information indicating positions of a set of compressed data blocks in the compressed file, the compressed data blocks corresponding to the set of raw data blocks.

5. The method according to claim 1, further comprising:
transmitting, to the failure analysis device, compressed data which is in the compressed file and corresponds to original position information.

6. The method according to claim 1, further comprising:
determining the set of raw data blocks from data related to the failure, the set of raw data blocks comprising a first subset of data blocks related to an application in the operating system and a second subset of data blocks related to an input/output operation of the application;
determining original position information based on positions of the first subset of data blocks and the second subset of data blocks in the data file; and
storing the original position information, the first subset of data blocks and the second subset of data blocks in the data file.

7. The method according to claim 1, wherein the failure of the operating system occurs within a storage system; and
wherein sending the compressed data block to the failure analysis device includes:
communicating the compressed data block from a disk array accessed by the storage system to the failure analysis device.

8. A method for analyzing a failure, comprising:
determining, based on original position information of a set of raw data blocks in a data file related to a failure of an operating system, a position of a to-be-analyzed data block in the set of raw data blocks in the data file;
sending, to a data processing device, a request for obtaining the to-be-analyzed data block, the request comprising a position of the to-be-analyzed data block in the data file; and
receiving, from the data processing device, a compressed data block corresponding to the to-be-analyzed data block for analyzing the failure.

9. The method according to claim 8, further comprising:
receiving at least one portion of a compressed file for the data file, the at least one portion comprising compressed data corresponding to the original position information and compressed data blocks corresponding to received data blocks in the set of raw data blocks; and
determining, based on the at least one portion, original positions and compressed positions corresponding to the received data blocks.

10. The method according to claim 9, wherein determining the original positions and the compressed positions comprises:
determining the original position information and the received data blocks based on the at least one portion of the compressed file;
determining the original positions based on the original position information and the received data blocks; and
determining the compressed positions based on the original positions and the at least one portion of the compressed file.

11. The method according to claim 8, wherein sending the request for obtaining the to-be-analyzed data block comprises:
determining, based on the position of the to-be-analyzed data block in the data file, whether the to-be-analyzed data block is in received data blocks in the set of raw data blocks; and
in response to determining that the to-be-analyzed data block is not in the received data blocks, sending, to the data processing device, the request for obtaining the to-be-analyzed data block.

12. An electronic device, comprising:
a processor; and
a memory storing computer program instructions, and the processor running the computer program instructions in the memory to control the electronic device to perform acts comprising:
in response to receiving, from a failure analysis device, a request for obtaining a to-be-analyzed data block in a set of raw data blocks in a data file related to a failure of an operating system, determining a position of the to-be-analyzed data block in a compressed file for the data file, the request comprising a position of the to-be-analyzed data block in the data file;
determining, based on the position of the to-be-analyzed data block in the compressed file, a compressed data block in the compressed file corresponding to the to-be-analyzed data block; and
sending the compressed data block to the failure analysis device for analyzing the failure.

13. The device according to claim 12, wherein determining the position of the to-be-analyzed data block in the compressed file for the data file comprises:
determining, based on the position of the to-be-analyzed data block in the data file, a first offset and a first length of the to-be-analyzed data block in the data file; and determining, based on the first offset and the first length, a second offset and a second length of the to-be-analyzed data block in the compressed file.

14. The device according to claim 12, wherein determining the compressed data block corresponding to the to-be-analyzed data block comprises:
    determining, based on the position of the to-be-analyzed data block in the compressed file, a second offset and a second length of the to-be-analyzed data block in the compressed file; and
    determining, based on the second offset and the second length, the compressed data block in the compressed file.

15. The device according to claim 12, the acts further comprising:
    obtaining the compressed file of the data file, the data file comprising original position information, the original position information indicating positions of the set of raw data blocks in the data file;
    decompressing the compressed file to obtain the original position information; and
    determining compressed position information based on the compressed file and the original position information, the compressed position information indicating positions of a set of compressed data blocks in the compressed file, the compressed data blocks corresponding to the set of raw data blocks.

16. The device according to claim 12, the acts further comprising:
    transmitting, to the failure analysis device, compressed data which is in the compressed file and corresponds to original position information.

17. The device according to claim 12, the acts further comprising:
    determining the set of raw data blocks from data related to the failure, the set of raw data blocks comprising a first subset of data blocks related to an application in the operating system and a second subset of data blocks related to an input/output operation of the application;
    determining original position information based on positions of the first subset of data blocks and the second subset of data blocks in the data file; and
    storing the original position information, the first subset of data blocks and the second subset of data blocks in the data file.

18. An electronic device, comprising:
    a processor; and
    a memory storing computer program instructions, and the processor running the computer program instructions in the memory to control the electronic device to perform acts comprising:
        determining, based on original position information of a set of raw data blocks in a data file related to a failure of an operating system, a position of a to-be-analyzed data block in the set of raw data blocks in the data file;
        sending, to a data processing device, a request for obtaining the to-be-analyzed data block, the request comprising a position of the to-be-analyzed data block in the data file; and
        receiving, from the data processing device, a compressed data block corresponding to the to-be-analyzed data block for analyzing the failure.

19. The device according to claim 18, the acts further comprising:
    receiving at least one portion of a compressed file for the data file, the at least one portion comprising compressed data corresponding to the original position information and compressed data blocks corresponding to received data blocks in the set of raw data blocks; and
    determining, based on the at least one portion, original positions and compressed positions corresponding to the received data blocks.

20. The device according to claim 19, wherein determining the original positions and the compressed positions comprises:
    determining the original position information and the received data blocks based on the at least one portion of the compressed file;
    determining the original positions based on the original position information and the received data blocks; and
    determining the compressed positions based on the original positions and the at least one portion of the compressed file.

21. The device according to claim 18, wherein sending the request for obtaining the to-be-analyzed data block comprises:
    determining, based on the position of the to-be-analyzed data block in the data file, whether the to-be-analyzed data block is in received data blocks in the set of raw data blocks; and
    in response to determining that the to-be-analyzed data block is not in the received data blocks, sending, to the data processing device, the request for obtaining the to-be-analyzed data block.

22. A computer program product having a non-transitory computer readable medium which stores a set of instructions to process data, the set of instructions, when carried out by computerized circuitry, causing the computerized circuitry to perform a method of:
    in response to receiving, from a failure analysis device, a request for obtaining a to-be-analyzed data block in a set of raw data blocks in a data file related to a failure of an operating system, determining a position of the to-be-analyzed data block in a compressed file for the data file, the request comprising a position of the to-be-analyzed data block in the data file;
    determining, based on the position of the to-be-analyzed data block in the compressed file, a compressed data block in the compressed file corresponding to the to-be-analyzed data block; and
    sending the compressed data block to the failure analysis device for analyzing the failure.

23. A computer program product having a non-transitory computer readable medium which stores a set of instructions to analyze a failure, the set of instructions, when carried out by computerized circuitry, causing the computerized circuitry to perform a method of:
    determining, based on original position information of a set of raw data blocks in a data file related to a failure of an operating system, a position of a to-be-analyzed data block in the set of raw data blocks in the data file;
    sending, to a data processing device, a request for obtaining the to-be-analyzed data block, the request comprising a position of the to-be-analyzed data block in the data file; and
    receiving, from the data processing device, a compressed data block corresponding to the to-be-analyzed data block for analyzing the failure.

\* \* \* \* \*